Patented July 17, 1928.

1,677,257

UNITED STATES PATENT OFFICE.

FRITZ ULLMANN, OF CHARLOTTENBURG, AND GERT TREWENDT, OF BERLIN, GERMANY, ASSIGNORS TO J. MICHAEL & CO., OF BERLIN, GERMANY.

PROCESS FOR THE MANUFACTURE OF ARSENIC ACID.

No drawing. Application filed June 26, 1923, Serial No. 647,901, and in Germany March 6, 1923.

This invention relates to the manufacture of arsenic acid from arsenic trioxide and/or arsenic by means of an acid catalyst of extremely low cost.

Arsenic acid has heretofore been made by an oxidation process with nitric acid.

Arsenic acid has also heretofore been made from a mixture of arsenic, chlorate of potassium and water, a solution of tetra-oxide of osmium being added as a catalyzer.

The nitric acid process requires extensive and costly plant installation because of the necessity for regeneration of the nascent nitric gases, and has the disadvantage that this process involves loss of nitrogen as well as loss of arsenic through the format on of insoluble arsenical sludge residuum.

The catalytic method by the use of tetra-oxide of osmium has not the disadvantages of the nitric acid process but because of the extremely high cost of the catalyzing agent, has not and probably never will come into extensive commercial use.

The object of our invention is to use the catalytic method but with a catalytic agent of such low cost as to permit of the production of arsenic acid by such method commercially, in which there remains no residue, no loss of arsenical material, and no poisonous fumes produced during oxidation.

By experiment and research, we have discovered that certain acids may be used as catalysts in the production of arsenic acid, among them being hydrochloric acid or substances containing vanadic acid radicle such as the vanadic salts or acid, and thus all the advantages of the catalytic method are obtained at a cost considerably less than the nitric acid method, without the large expenditure for plant and equipment which the latter process requires, and with the ability to employ a catalyst much below the cost of the expensive catalyst tetraoxide of osmium.

There are a variety of ways in which our invention can be used, and within reasonable limits the quantities of the chemicals used may be varied and some substitutions may be made, as, for instance, the substitution of arsenic (As) for trioxide of arsenic ($As_2O_3$), without departing from the principle involved in our process.

We have discovered that trioxide of arsenic ($As_2O_3$) and arsenic (As) can be readily, easily and quantitatively transformed into arsenic acid, if slight quantities of non-nitrogenous acids or non-nitrogenous salts, such as hydrochloric acid, or vanadic acid, or vanadic salts, copper salts or the like, are added as a catalytic.

For the purpose of illustration, we give below a satisfactory formula for the production of arsenic acid by our method, but we wish it distinctly understood that this example is for the purpose of illustration only and is not to be treated as a limitation of our invention. Said formula is as follows:

A mixture of 10 parts of trioxide of arsenic ($As_2O_3$) 20 parts of water ($H_2O$) and 3.8 parts of potassium chlorate ($KClO_3$) is heated to boiling temperature and then 0.7 parts of hydrochloric acid (H.Cl) in a solution of 1.1 specific gravity is slowly added to the mixture. With the violent reaction the trioxide of arsenic will soon dissolve and a solution of arsenic acid is obtained.

The solution of arsenic acid obtained by this process is particularly adapted for use in the production of arsenate of calcium, an insecticide of particular value in controlling the boll weevil and other crop parasites.

Having described our invention, what we claim and desire to secure by Letters Patent is:

1. The process of making arsenic acid which consists in heating to boiling a solution comprising 10 parts of arsenic trioxide, 20 parts of water and 3.8 parts of potassium chlorate, and then adding thereto a small amount of hydrochloric acid.

2. The process of making arsenic acid which consists in heating to boiling a solution comprising approximately twice as much water as arsenic trioxide and approximately one-fifth as much of potassium chlorate as water, and then adding thereto a small amount of hydrochloric acid.

3. The process of making arsenic acid which consists in heating to boiling a solution comprising approximately 10 parts of arsenic trioxide and 4 parts of an oxidizing agent, and adding thereto a small amount of hydrochloric acid.

In testimony whereof we affix our signatures to this specification.

FRITZ ULLMANN.
GERT TREWENDT.